(12) United States Patent
Muir (10) Patent No.: US 9,116,672 B2
(45) Date of Patent: Aug. 25, 2015

(54) METHOD AND SYSTEM FOR DISPLAYING SELECTABLE AUTOCOMPLETION SUGGESTIONS AND ANNOTATIONS IN MAPPING TOOL

(75) Inventor: Eliot Mervyn Muir, York (CA)

(73) Assignee: iNTERFACEWARE Inc., Toronto (CA)

( * ) Notice: Subject to any disclaimer, the term of this patent is extended or adjusted under 35 U.S.C. 154(b) by 48 days.

(21) Appl. No.: 12/954,176

(22) Filed: Nov. 24, 2010

(65) Prior Publication Data

US 2012/0131547 A1    May 24, 2012

(51) Int. Cl.
*G06F 9/44* (2006.01)

(52) U.S. Cl.
CPC .... *G06F 8/20* (2013.01); *G06F 8/33* (2013.01)

(58) Field of Classification Search
CPC .................................. G06F 8/20; G06F 8/33
USPC .................................................. 717/109, 129
See application file for complete search history.

(56) References Cited

U.S. PATENT DOCUMENTS

| 5,446,900 | A | 8/1995 | Kimelman | |
|---|---|---|---|---|
| 6,862,711 | B1 | 3/2005 | Bahrs et al. | |
| 6,964,036 | B2 | 11/2005 | Bates et al. | |
| 7,506,313 | B2 | 3/2009 | Bates et al. | |
| 7,587,385 | B2 | 9/2009 | Vayssiere | |
| 7,660,886 | B2 | 2/2010 | Abdelhadi et al. | |
| 2007/0044069 | A1* | 2/2007 | Doucette et al. | 717/106 |
| 2007/0055922 | A1 | 3/2007 | Martynov et al. | |
| 2007/0198474 | A1 | 8/2007 | Davidson et al. | |
| 2007/0203746 | A1* | 8/2007 | DeHaan et al. | 705/2 |
| 2008/0276223 | A1* | 11/2008 | Morgan et al. | 717/125 |
| 2008/0320438 | A1* | 12/2008 | Funto et al. | 717/106 |
| 2009/0119575 | A1 | 5/2009 | Velusamy | |
| 2010/0083225 | A1* | 4/2010 | Giat | 717/111 |
| 2010/0162217 | A1* | 6/2010 | Morrison | 717/129 |
| 2010/0269032 | A1* | 10/2010 | King et al. | 715/234 |
| 2010/0269095 | A1* | 10/2010 | King et al. | 717/111 |

OTHER PUBLICATIONS

Naboulsi, Run to Cursor (Published May 5, 2010) retrieved from http://blogs.msdn.com/b/zainnab/archive/2010/05/05/run-to-cursor-vstipdebug0023.aspx on Oct. 31, 2012.*
Collingbourne, H., "Making sense of Ruby," (http://www.theregister.co.uk/2007/02/01/making_sense_ruby/), Posted Feb. 1, 2007, Accessed Jun. 14, 2011.
"Code completion for dynamic languages," (http://wordaligned.org/articles/code-completion-for-dynamic-languages), Posted Feb. 2, 2007, Accessed Jun. 14, 2011.
International Search Report, mailed on Mar. 26, 2012, from International Application No. PCT/IB2011/002765, filed on Nov. 21, 2011.

* cited by examiner

*Primary Examiner* — Don Wong
*Assistant Examiner* — Theodore Hebert (57) ABSTRACT

A method and system for generating annotations in a code editor of a development environment is provided. A user enters code into a code editor of a development environment and the code accesses a data source. The execution of the code accesses the data and presents output to the user in the code editor in real time. Another aspect is the triggering of an autocompletion event, which causes the code to be compiled and executed, wherein the executing of the code accesses the data and presents selectable options for autocompletion and enabling user selection of available options.

26 Claims, 12 Drawing Sheets

METHOD AND SYSTEM FOR DISPLAYING SELECTABLE AUTOCOMPLETION SUGGESTIONS AND ANNOTATIONS IN MAPPING TOOL

BACKGROUND OF THE INVENTION

Many companies, such as those in the healthcare industry, rely on information systems to run their businesses. Information systems are used to store, process and exchange information between offices and employees. For example, a single company in the medical industry may have a billing system, payroll system, a health information system, an insurance information system, a picture or medical image archiving and communication system, an employee scheduling system as well as other systems.

Moreover, with evolving technology and new problems being presented, it is common for the companies to deploy new information systems to handle newly computerized tasks associated with the business. Similarly, new companies are formed, others fail, and businesses merge creating new companies with even more information systems that are often incompatible with each other. It is further common for companies and governmental agencies to exchange information between each other electronically. Here also, it is required to have heterogeneous information systems exchanging data with each other.

All of these different information systems should ideally be able to communicate with each other and share information even if the information is only entered into one system. In reality, however, different information systems are difficult to integrate because they are often implemented at different times and created or supplied by different vendors. The result is a collection of incompatible information systems unable to exchange information.

To help resolve the problem of incompatibility, many industries have developed electronic data interchange standards such as Electronic Data Interchange (EDI), Society for Worldwide Interbank Financial Telecommunications (SWIFT), American National Standards Institute Accredited Standards Committee X12 (X12), or Health Level 7 (HL7). These electronic data interchange standards provide guidelines for how information is exchanged between different computer systems. In a typical implementation, the data are structured in a hierarchical tree to represent the hierarchical nature of the data stored within a data source.

Generally, different industries will often employ different electronic interface standards because different industries need to store and exchange different data. Moreover, the different electronic data interchanges are customized for the industry in which they are used. For example, the SWIFT standard is generally only used in the financial industry and the HL7 standard is generally only used in the medical industry. The reason is because financial institutions would not need to exchange patient information or medical reports, but they do need to exchange information such as the originating bank, the destination bank, and the amount of money transferred in a financial transaction.

Additionally, even when two information systems or organizations are both following the prescribed guidelines of an electronic data interchange standard, there will still be scenarios where the information from one system is not in a compatible format with the information from another system or organization. To resolve the issue of incompatible information, companies will implement middleware. Middleware typically does not add functionality to any of the systems, rather it serves as an intermediary or glue between different systems to help integrate systems that would otherwise be incompatible. It functions to map information from one information system to target variables of another information system.

Figure 1:
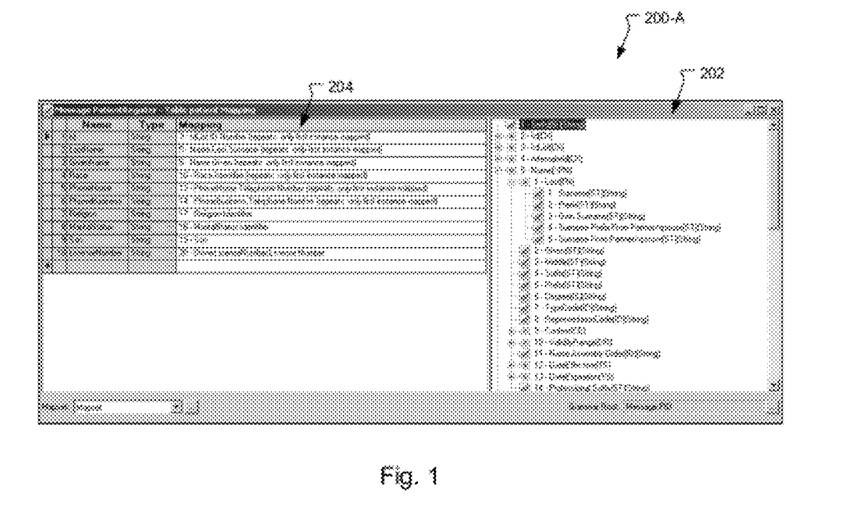
FIG. 1 shows a GUI of a middleware tool for mapping fields between computer systems.

FIG. 1 provides an example of a graphic user interface (GUI) of computer software 200-A that is used to map information. The GUI is used to map data from one computer system to another by defining a target variable that will receive the data from another system. In more detail, the right hand window 202 shows a series nodes or fields from a data source. In this example, the data source is HL7 messages used in the medical industry. In the left side window 204 is a table that shows which target variables are being mapped to which field of the data sources. This matching process must be repeated for every target variable and corresponding field of the data source for sharing information between systems.

Figure 1A:
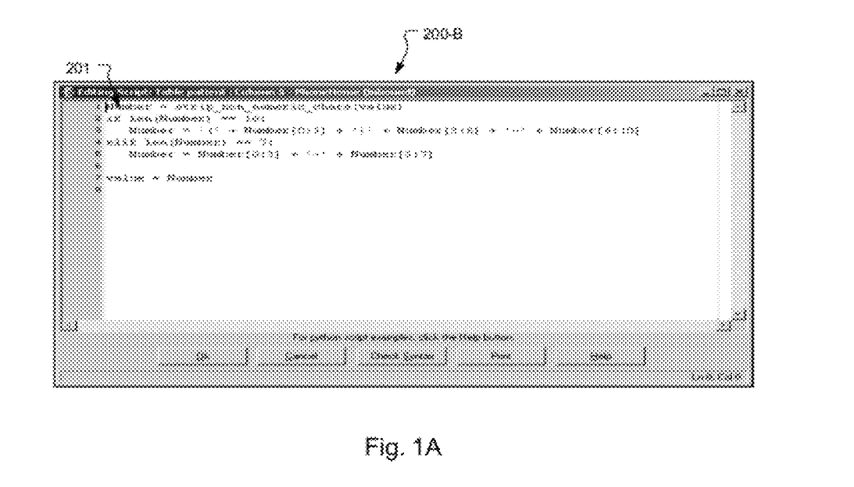
FIG. 1A shows a code editor window of the middleware tool for mapping fields between computer systems.

In theory, a GUI seems like the best approach to perform the process of mapping the data source to the target variables. Generally, a GUI is intuitive and easy to use for most users and very little programming knowledge is required. And in the rare cases where information needs to be further manipulated, a code window 200-B as shown in FIG. 1A is provided to allow users to create short scripts as needed. The illustrated example is a script 201 for transforming a ten digit phone number into the area code, prefix, and line number.

SUMMARY OF THE INVENTION

In real-world situations, however, implementing a mapping solution is often far more complicated. Typically, different information or computer systems require information to be transferred into a specific format. Additionally, the different information systems each process information differently and use separate, business-specific algorithms. Moreover, for the information to be exchanged from one system to another, it must be transformed into the proper format expected by the target system. The mapping and transformation of the fields must be performed for each field shared with each system. As more systems need to be integrated and more fields need to be shared (or mapped), using a GUI becomes less efficient and more complicated. Simultaneously, the need for specialized and customized program scripts increases.

The result is that the custom scripts, which were originally intended to resolve the occasional minor problem, have become the primary means employed by many integration programmers for mapping fields from one system to another.

The use of text based program scripts, however, is not free from problems either. For example, a programmer will typically use an integrated development environment (IDE), which includes a text or code editor, compiler, and a debugger to create executable programs. The process of mapping variables in a text based code editor can become equally complicated because the syntax of a programming language lacks the intuitiveness of a GUI. The code editor merely displays line after line of instructions, which can be confusing to integration programmers. Additionally, because each field of the data source needs to be mapped to a target variable for each information or computer system, the numbers of lines of code can quickly escalate.

To help in the coding process many IDEs provide an autocompletion feature in the code editor that aids the programmer in completing expressions. Autocompletion works because when writing code some expressions can only be completed properly a limited number of ways. The autocompletion recognizes the beginning of the expression and presents a list of the possible ways in which to finish the phrase. The autocompletion feature, however, only guarantees that the syntax of the argument is correct, not that the logic is correct. Thus, the programmer can have code that compiles and executes, but does not operate as intended.

Likewise, another problem with a traditional IDE is the process of debugging. Debugging requires compiling and executing the code and then tracing through the code, in a sequential fashion looking for errors. The programmer must locate the incorrect portion of code, edit the code, re-execute the code, and re-check to ensure that all mistakes are fixed. The process is repeated until the program operates without flaws and as the programmer intended. This method of debugging is inefficient, tedious and time consuming. Moreover, when this process is applied to the already repetitive and tedious nature of mapping fields, a difficult problem becomes harder. Thus, a better system and method is needed for writing and debugging middleware.

In general, according to one aspect, the invention features a method for generating annotations in a code editor of a development environment running on a computer. In more detail, the method includes receiving programming code from a user via the code editor of the development environment. Further, the programming code accessing a data source such as a queue of HL7 messages in an integration engine. The method further includes automatically compiling and executing the program code as the code is being input by the user, wherein executing the code access the data source. Lastly, the method includes presenting the output from the execution of the program code to the user in the code editor.

In general, according to another aspect, the invention features a system for generating annotations in a code editor of a development environment. In more detail, a development environment, executing on a computer, including a code editor that receives programming code and accesses a data source is provided. The system also includes a compiler that automatically compiles and executes the program code as the program code is being input by the user, wherein executing the program code accesses the data source. The system also includes a display device that presents the output from the execution of the program code to the user in the code editor.

One advantage of the present invention is that a user is able to see the contents of the data source as they write the code and map the fields between computer systems. Another advantage is that by displaying the fields, and the contents of the fields, a programmer will spend far less time writing and debugging code because the programmer is able to see the actual runtime data of the executing code updated in real time as the code is being written. This is in contrast to a traditional debugger which only offers a sequential step by step picture of what the code is doing after a separate compile and run cycle.

In general, according to another aspect, the invention features a method of autocompletion of a programming variable in a code editor of a development environment. In more detail, the method includes receiving part of a programming variable into the code editor of the development environment that triggers an autocompletion event, wherein the programming variable is part of a larger set of instructions. The method further includes that upon triggering the autocompletion event, automatically compiling and executing the program code in the code editor until a breakpoint at the cursor is reached. The method further includes determining the values of programming variables in real time and generating selectable options for autocompletion of the programming variables. The method further includes presenting the selectable options for autocompletion and their corresponding values in a window beside the programming variable and enabling user selection of the selectable output. Lastly, completing the programming variable based on the user selection of the selectable output.

In general, according to another aspect, the invention features a system for autocompletion of a programming variable in a code editor of a development environment that is displayed by a computer. In more detail, a development environment including a code editor is provided. The code editor receives part of a programming variable that triggers an autocompletion event. The compiler will compile and execute the programming code in the code editor accessing a data source, based on the triggering of the autocompletion event, until a breakpoint is reached. Selectable output is generated and displayed by the computer based on the values of a data source, wherein the selectable output is presented to the user in the code editor. Finally, the selectable output is presented to the user in the code editor and the user is able to select the output to complete the programming variable.

An advantage of the present invention is that the user is provided with a system and method of greatly superior autocompletion because the selectable options also display the contents of fields in the data source and target variables. Thus, the user is assured that the selected output for autocompletion is correct not only in syntax, but also that the correct field of the data source is mapped to the correct target variable. Traditional implementations of autocompletion do not have access to the runtime data of the code and thus do not offer the level of functionality of the present invention.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 2:
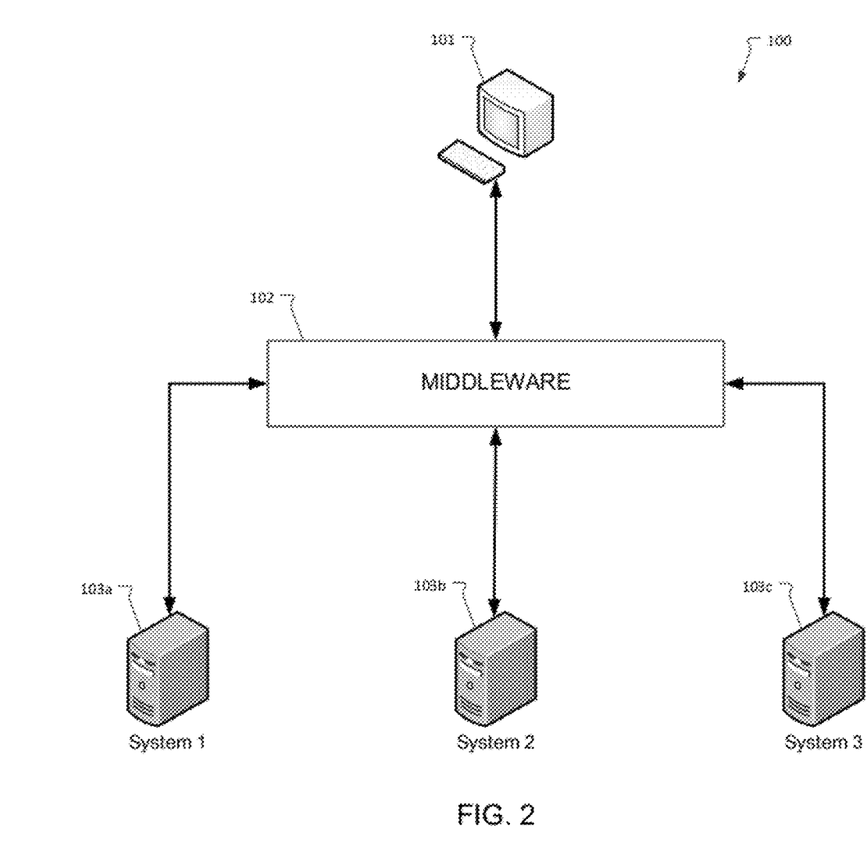
FIG. 2 is block diagram that provides an overview of how middleware integrates multiple heterogeneous computer information systems.

FIG. 2 shows how the middleware 102 sits between the various computer systems 103a, 103b, 103c, on which information systems are implemented.

The middleware 102, which helps to integrate the different systems 103a, 103b, 103c, creates the appearance of a unified system, capable of sharing information. The middleware 102 typically includes computer software running on a computer system that is deployed between the various information systems 103a, 103b, 103c on a computer network.

The middleware 102 is configured by a workstation 101. A workstation 101 is preferably a computer system such as personal computer, laptop, or tablet device. The workstation includes a central processing unit, random access memory, and a data storage device. Further, the workstation 101 preferably includes human interface devices such as a keyboard, mouse, touch screen interface and a display device such as monitor or screen.

The information systems 103a, 103b, 103c are computer systems and each include a central processing unit, random access memory, and data storage device. Likewise, the computer systems 103a, 103b, 103c will also include human interface devices such as a keyboard, mouse, touch screen interface and output display device in some implementations.

The user workstation 101 runs an integrated development environment for configuring the middleware 102. A user-programmer inputs information via a user input device, such as a keyboard, to generate the computer code. A graphical user interface (GUI) of the development environment is displayed on the monitor of the workstation 101. This facilitates the user's generation of the computer code that will be executed by the middleware 102.

Figure 3:
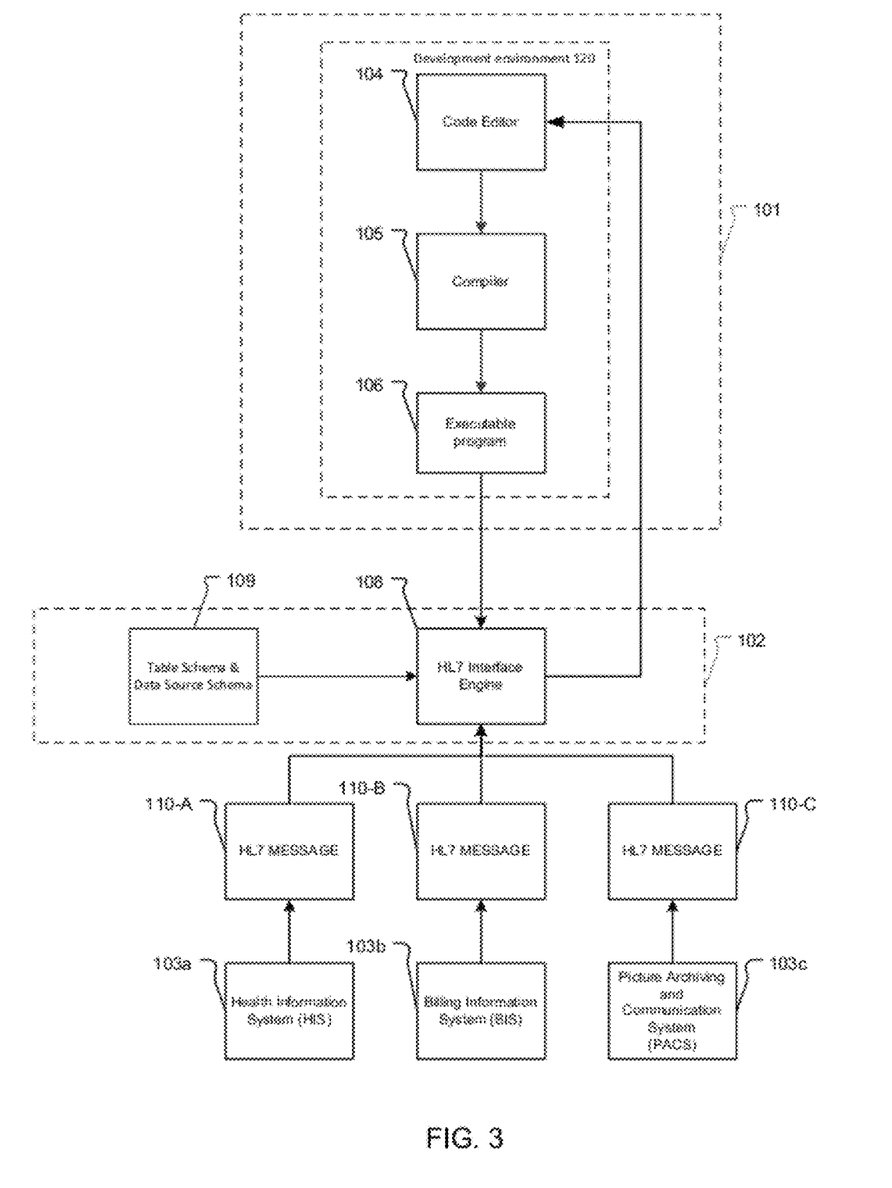
FIG. 3 is a block diagram illustrating the interrelation of the components between the development environment, integration engine, and various computer information systems.

FIG. 3 is a block diagram illustrating the interrelation of the components between the development environment, integration engine, and various computer information systems.

In the typical deployment, the development environment 120 runs on the workstation computer system 101. The development environment 120 includes a code editor 104. This is a text editing program designed specifically for editing code. The code editor 104 provides features such as syntax highlighting and autocompletion features.

A compiler 105 of the development environment 120 transforms the code in the code editor into computer instructions, which is often referred to as object code. This yields an executable program 106 that is run by an interface engine 108 that executes on the middleware computer system 102. In the typical application, the executable program 106 maps variables from a data source to target variables to enable different computer systems 103a, 103b, 103c to seamlessly exchange information.

Information about fields in the data source are also collected and fed back into the code editor 104. The HL7 interface engine 108 receives HL7 messages 110-A, 110-B, 110-C from different computer systems 103a, 103b, 103c. Schemas 109 are supplied to the HL7 interface engine 108 to provide a definition of what the expected fields in the HL7 data.

In one simplified example, the billing information system (BIS) 103b, for example, needs a name, address, and insurance information to mail a bill to a patient. The health information system (HIS) 103 needs a name, date of birth, and emergency contact name. And the picture archiving and communication system (PACS) 103c needs a patient name, patient number, and primary doctor.

While the different systems are used for performing different tasks and require different information, all the systems need the same field containing the patient's name during their normal operation. By mapping a target variable during the programming stage for each system that receives the field data containing the patient name, all the systems will have access to that name regardless of which system the information was originally entered during normal operation.

During the programming stage, the contents of the fields of the HL7 messages 110-A, 110-B, 110-C are fed back into the code editor 104 via the HL7 integration engine 108. This information is presented to the user-programmers that are tasked with the information system integration. The information is presented as annotations as the user enters code into the code editor 104. The result is that the annotations display runtime data in the code editor 104 while the programmer enters text.

Figure 4:
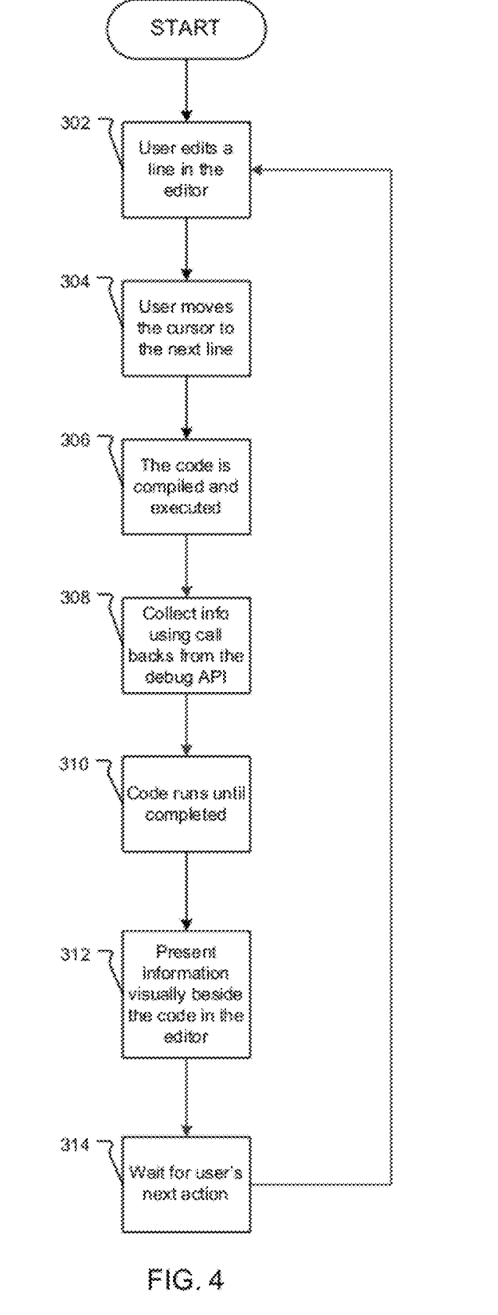
FIG. 4 is a flow diagram illustrating the steps of how annotations are displayed for a user in the code editor.

FIG. 4 is a flow diagram illustrating the steps of how annotations are displayed for a user in the code editor 104.

First, a user edits a line of a script in the code editor 104 in step 302. In a preferred embodiment, the movement of the cursor to another line by the user, in step 304, causes the script to be automatically compiled by compiler 105 and executed by the interface engine 108 in step 306. In other embodiments, however, other means of automatically or manually triggering the compiler 105 are implemented such as by user control via the GUI of the editor 104.

In the next step 308, based on instructions in programming code, information is collected about the fields of the data source using callbacks from the debugger application program interface (API) of the language runtime. In a typical implementation, the user is able to specify which HL7 messages 110-A, 110-B, 110-C will be accessed by the interface engine 108.

In one example, the code in the code editor 104 is executed and collects information from the HL7 message 110-A from the HIS 103a. In another execution of the script, the code will be executed with the data source collecting information from an HL7 message 103c originating from the PACS 103c. The result is that the annotations will display the collected data from the corresponding data source.

In the next step 310, the code runs until it is completed to ensure that all of the information about the fields in the data source has been collected. The collected data becomes output information. The output information is then displayed to the user in step 312 in the code editor 104. In a preferred embodiment the annotations are displayed beside the code in the code editor 104. In other embodiments, the annotations are displayed in a separate window or in a pop-up window. The result is that the user is able to see the contents of the fields in the data source with the real content from the data source. The system then waits for the next action in step 314.

Figure 5:
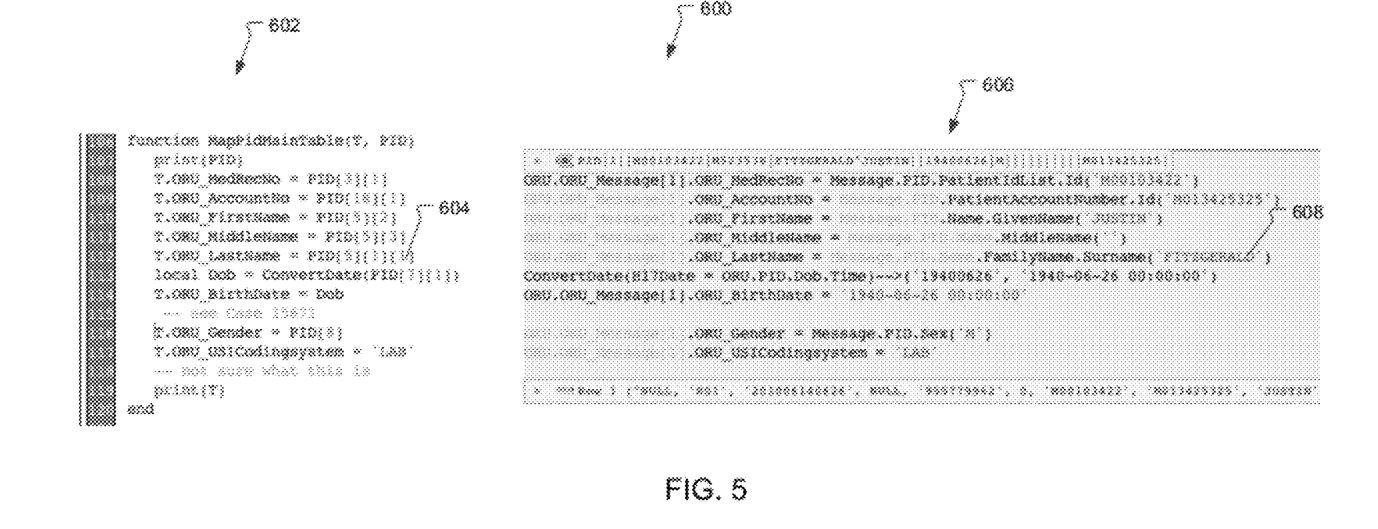
FIG. 5 shows an example of annotations displayed beside the code in the code editor.

FIG. 5 shows the editor's GUI 600 illustrating an example of annotations displayed beside the code in the code editor 104.

The left side displays script code 602 written by the programmer. The code 602 is a series of instructions that function to map fields of the data source to target variables. For example, variable 'T.ORU_LastName' is being mapped to PID [5][1][1] in line 604. The real contents of each field of the data source are displayed as annotations 606 to the user in the code editor 104. Thus, a user is able to see the exact contents of the field of the data source that has been mapped to a target variable. For example, the annotations 608 clearly show the contents of the data source.

Figure 6:
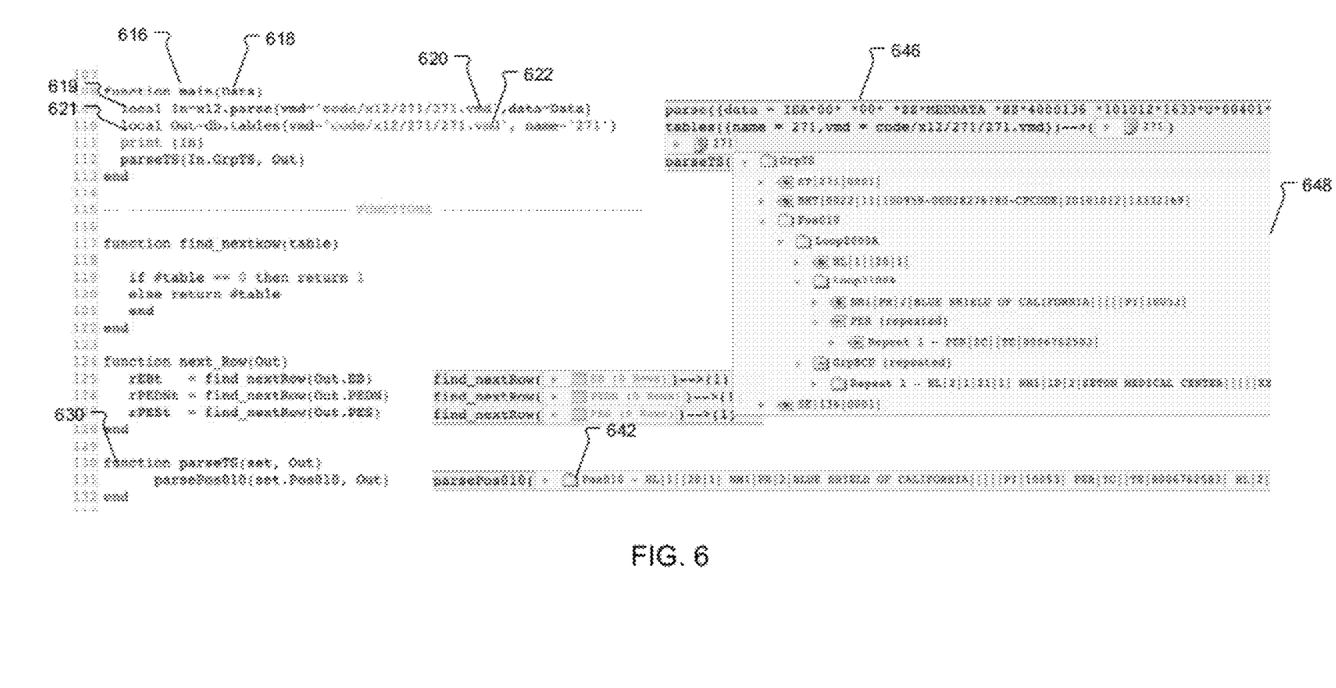
FIG. 6 shows an example of how data are passed from the main function into sub-functions to display annotations in the sub-functions.

FIG. 6 shows how data are passed from the main function 616 into a sub-function 630 to display annotations within the sub-function. In this example, the data source is an X12 document. In alternative embodiments, the data source will be a Digital Imaging and Communications in Medicine (DICOM) header, a JavaScript Object Notation (JSON) message, a SWIFT transaction (or message), an Electronic Data Interchange For Administration Commerce and Transport (EDIFACT) document, an Extensible Markup Language (XML) document, or one of the other data sources utilizing a similar electronic data interchange standard.

In more detail, as the user enters text into the code editor 104, the script is automatically compiled and executed until a breakpoint at the cursor is reached. Having the breakpoint at the cursor causes the program to be continually compiled and executed, but the code editor 104 still retains the traditional functionality of a code editor because the script always stops at the cursor. Thus, a user can move from line to line and edit different sections within the code editor 104 and the script will automatically be compiled and executed to wherever the cursor is located, in the current embodiment. The script, however, will always pause at the breakpoint to allow the user to enter text into the code editor 104.

The compiling and execution of the code begins with the main function 616. Typically, a main function provides high level organization of the overall program and any sub-functions. In a preferred embodiment, the main function 616 is called with real data 618 from a data source and specifically real messages 110. In another embodiment, the data source is accessed in a sub-function within the programmable code.

During execution of the script, the main function 616 loads two files 620, 622 that correspond to the table schema and data source schema 109 to supply a definition of the expected fields and their definitions. In this example, the first schema file 620 is loaded to supply information pertaining to the data source and the second schema file 622 is loaded to supply information pertaining to the table of target variables. Without the schema files 620, 622, the data from the data sources and the table of target variables would just be an unintelligible grouping of data.

Based on the information provided by the schema files 620, 622, the main function 616 creates a variable 619 that stores the parsed message data from the data source and another variable 621 that stores the table of target variables. Generally, the data are stored as a hierarchical tree that is separated into many different segments. The different segments are comprised of many different data fields that are organized in a specific order. The specific order and the expected contents of the field are dictated by the schema 109 and the electronic data interchange standard.

Once the data 618 from the data source has been accessed and parsed in the main function 616, the data are then displayed as an annotation 646 beside the code in the code editor 104.

Moreover, displaying annotation in sub-functions only requires passing the desired data into the sub-function. For example, main function 616 makes a call to function 'parseTS' 630 and passes in two variables 'In.GrpTS' and 'Out'. The data are then displayed as an annotation 642 in the sub-function 630. Now, the data can easily be verified by the programmer-user comparing the annotations 642 in the sub-function with the annotations 648 in the main function.

Figure 7:
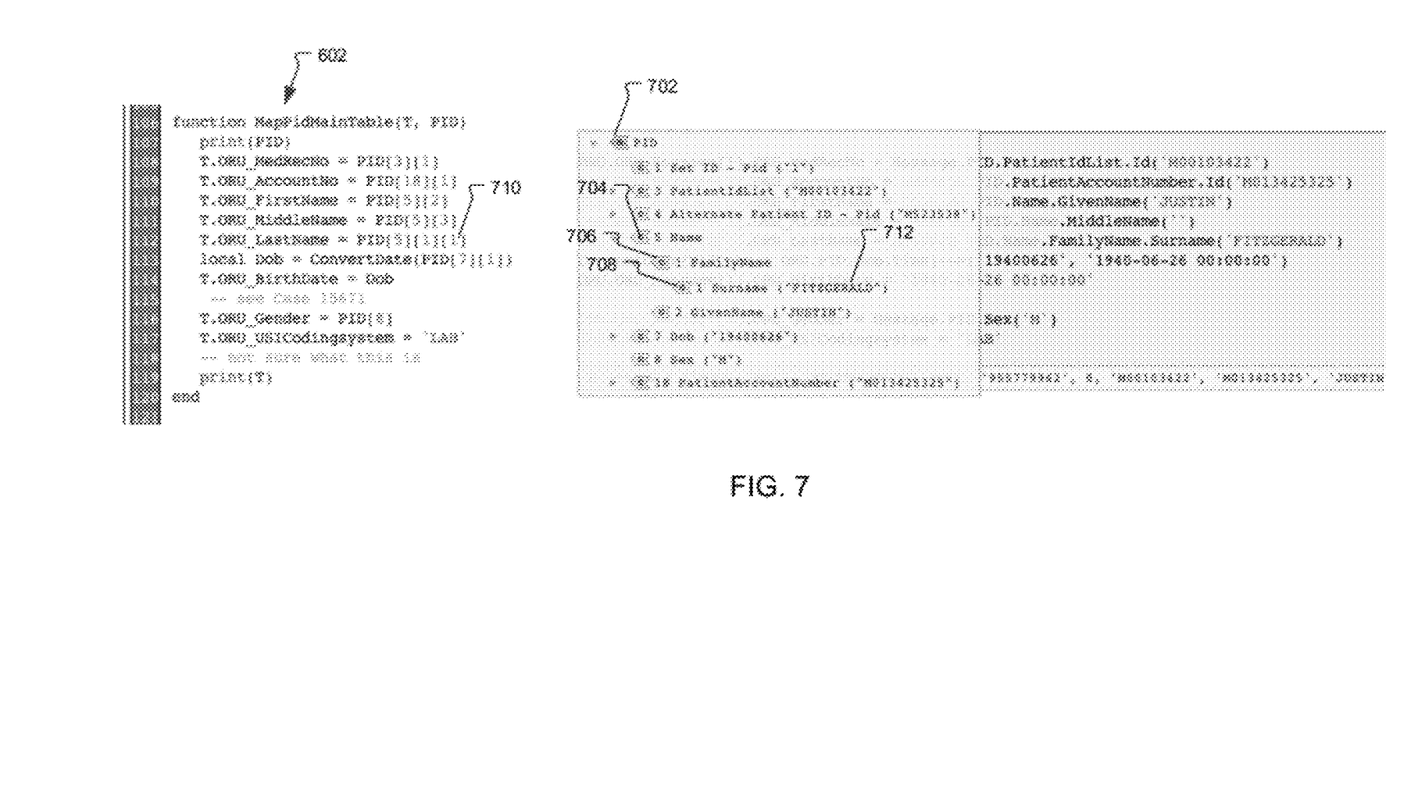
FIG. 7 illustrates an example of how the annotations also display the different fields as part of node tree with multiple levels or branches.

FIG. 7 illustrates an example of how the annotations also display the different fields of the data source as a node tree with multiple branches.

The left side contains the same written code as in FIG. 5. In this example, however, the annotations that are displayed in the code editor 104 appear as a node tree 704. A node tree is a way to visually represent the hierarchical nature of data structures that are typical of electronic data interchange standards. There are many different types of nodes such as parent nodes, child nodes, sibling nodes, uncle node, root nodes, and leaf nodes (or end nodes). The different node types describe the hierarchy of the segments. For example, a root node is node that has no superior node and a leaf node (or end node) is a node that has no subsequent child node. Similarly, the connections between the parent nodes, children nodes, and root nodes make up the branches of the tree.

Displaying the data fields in annotations as a node tree provides a visual representation of the hierarchal structure of the data. For example, the expression 'PID[5][1][1]' at line 710 is clearly understood to be from the 'PID' segment 702, from the fifth data field (Name) 704, first sub-field (FamilyName) 706, first sub-sub-field (Surname) 708. Additionally, the content of the data field 712 is also displayed.

Figure 8:
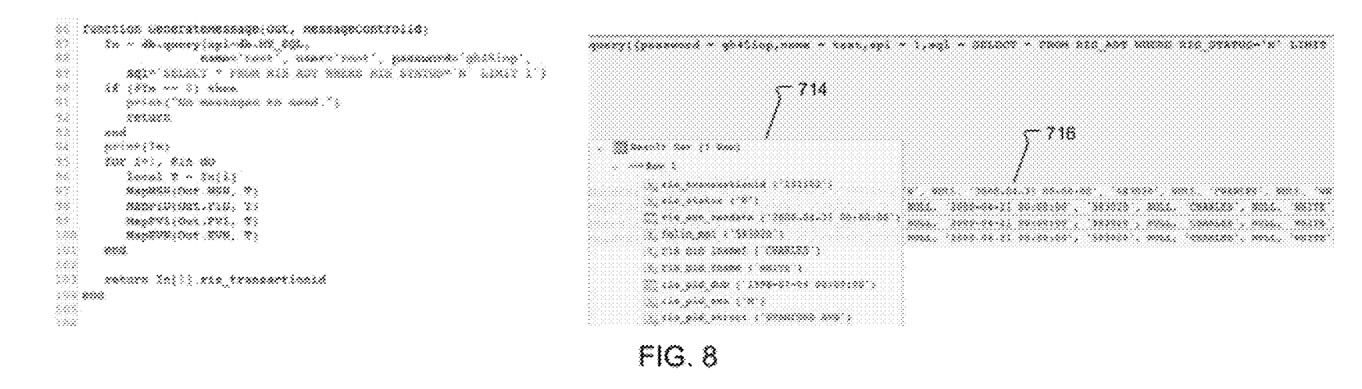
FIG. 8 shows an example of the annotations displaying HL7 message data beside the code in the code editor.
Figure 9:
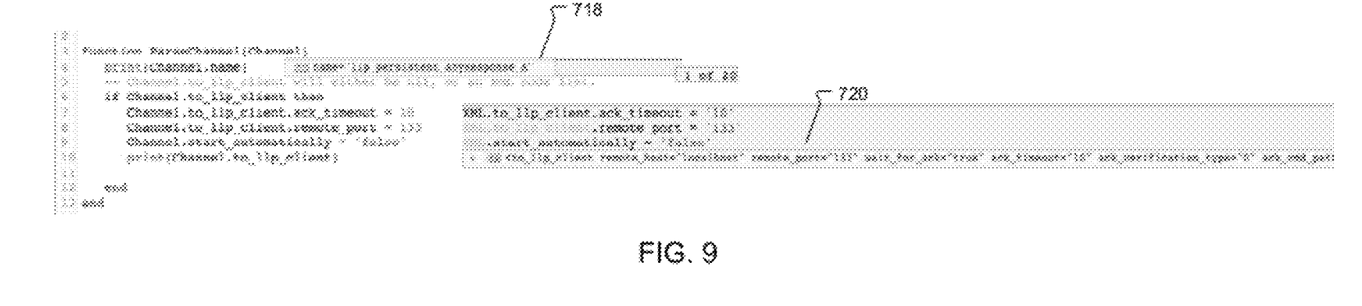
FIG. 9 shows an example of the annotations displaying XML document data beside the code in the code editor.

FIGS. 8 and 9 show additional examples wherein annotations are displayed for different data sources that are accessed.

For example, FIG. 8 shows an example of a sub-function written to generate HL7 messages. In this example, the data from a radiology information system (RIS) need to be mapped to other computer systems. The annotations 714 display the contents for the RIS data and the mapped target variables 716. Similarly, FIG. 9 shows an example of a function written to parse XML data. The annotations 718, 720 display the contents of the XML data in the code editor 104 beside the code.

Figure 10:
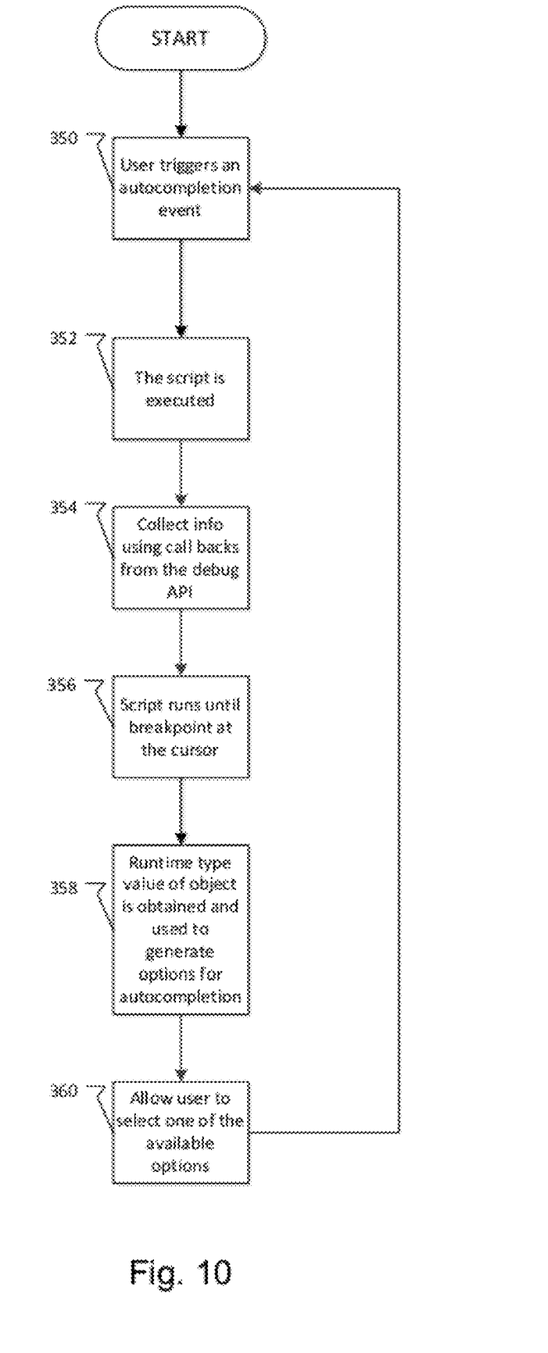
FIG. 10 is a flow diagram illustrating the steps of how the autocompletion feature displays selectable options to a user.

FIG. 10 is a flow diagram illustrating the autocompletion feature and the display of selectable options to a user.

Upon entering text into the code editor the user triggers an autocompletion event in step 350. Typically, an autocompletion event is triggered by typing a period after specific partially completed instructions. After triggering the autocompletion event, the code is compiled and executed in step 352. Similar to generating annotations, based on the instructions in the code, information is collected from the data source. As with generating annotations, the user is able to specify which electronic data interchange message from the different computer systems will be accessed by the data source. Additionally, different autocompletion suggestions will be presented to the user in the code editor based on the contents of the fields of the data source.

The code is run until a break point is reached in step 356. In a preferred embodiment, the break point is at the line of code where the cursor resides.

The contents the fields of the data source are obtained and used to generate selectable options for autocompletion in step 358. The selectable options are presented to the user code in code editor 104 with the actual data of the fields in the data source. Thus, the user selecting an option is also able to select options and see the actual data of field that needs to be mapped to the target variable.

In a preferred embodiment, the selectable options are presented beside the code, but the selectable option could be presented in other locations or by other means.

Selecting an option will complete the line of the code in the code editor with proper syntax to correctly map the target variable and the data source. Because the programmer is able to see the real contents of the fields and the names of variables the autocompletion tool helps to make the programmer more efficient and eliminate mistakes of incorrectly mapping target variables to wrong fields in the data source.

Figure 11:
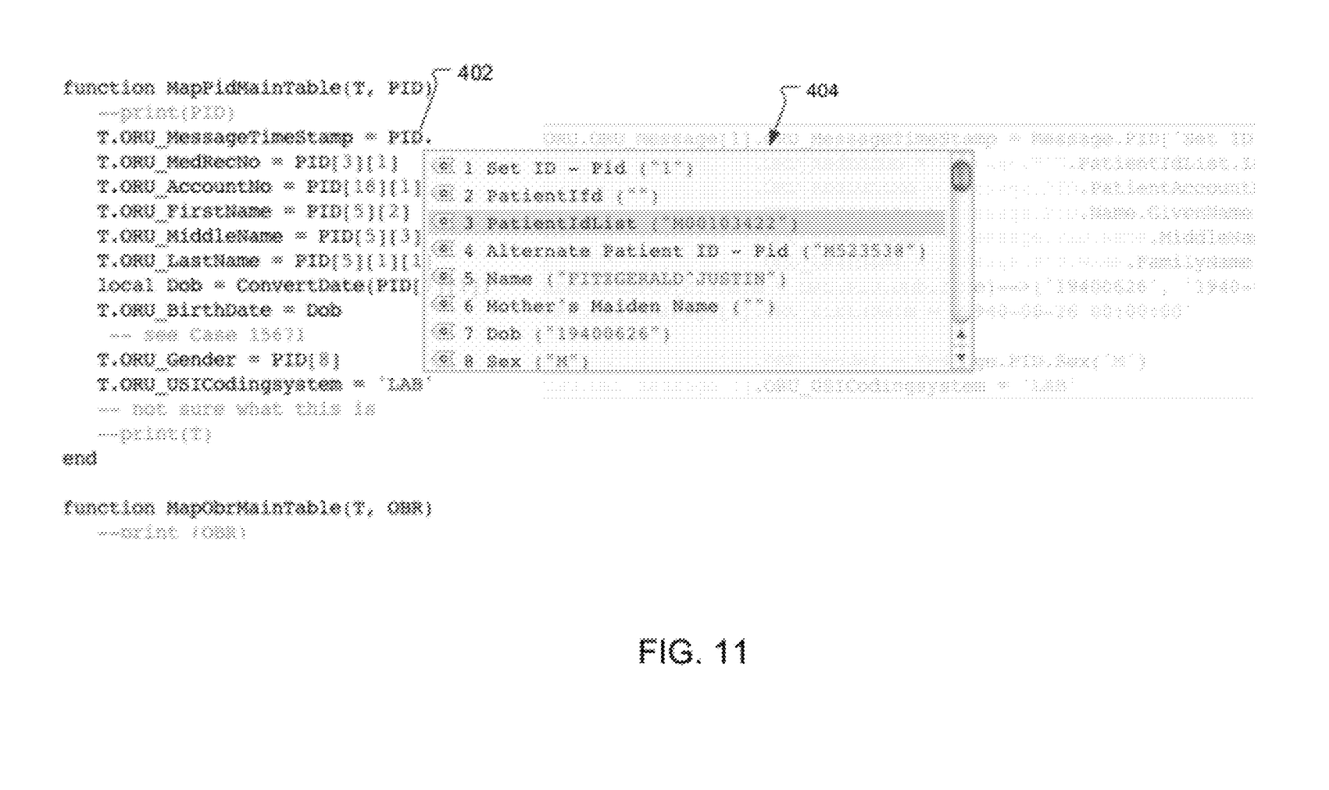
FIG. 11 shows an example of the autocompletion feature displaying selectable options and the contents of the fields beside the code in the code editor.
Figure 12:
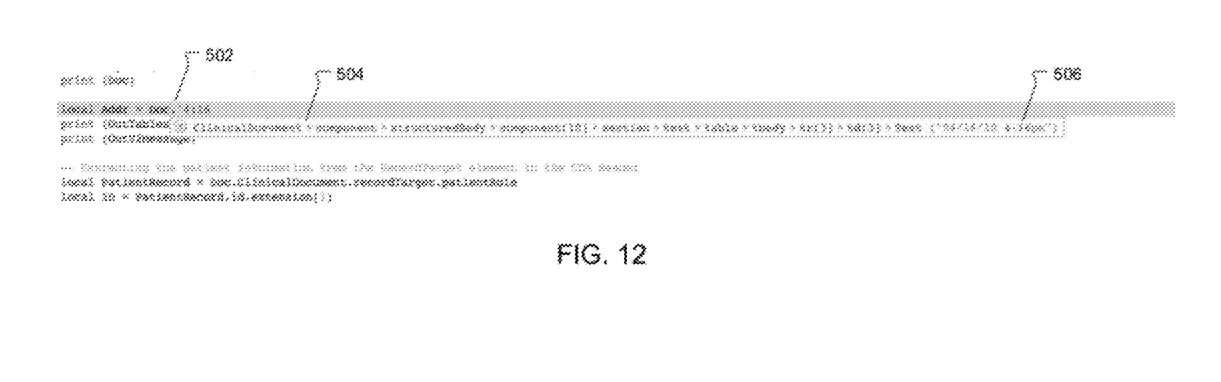
FIG. 12 illustrates the ability to generate 'deep' autocompletion based on information deeply nested within a field.

Examples of how the selectable options for autocompletion are displayed to users in the code editor are provided in FIGS. 11 and 12.

FIG. 11 illustrates an example of the selectable options displayed to the user in the code editor 104.

An autocompletion event has been triggered by starting to map a target variable to a field and entering a period, see 402. Upon triggering the autocompletion event, selectable options are presented to the user in window 404 with real data from the fields of the data source such as messages 110. The selectable options are presented as a list of all the possible fields that can be mapped to a target variable. After an option is selected, the line of code is completed with the proper syntax in the editor 104.

FIG. 12 illustrates the ability to do 'deep' autocompletion based on a word of phrase located within a field.

By way of an example, an autocompletion event has been triggered 502. Using the phrase '4:16' typed in by the user, the autocompletion tool searches for this in the fields of the data source.

All of the fields of the data source that have the phrase '4:16' are presented as selectable options to the user in the code window 504. In this example, just one field has the desired phrase 506. Upon selecting the option, the line of code will be completed and the target variable with be mapped with the proper syntax. The ability to search the contents of the fields for real data from messages 110 greatly increases the speed and efficiency of mapping variables.

Figure 13:
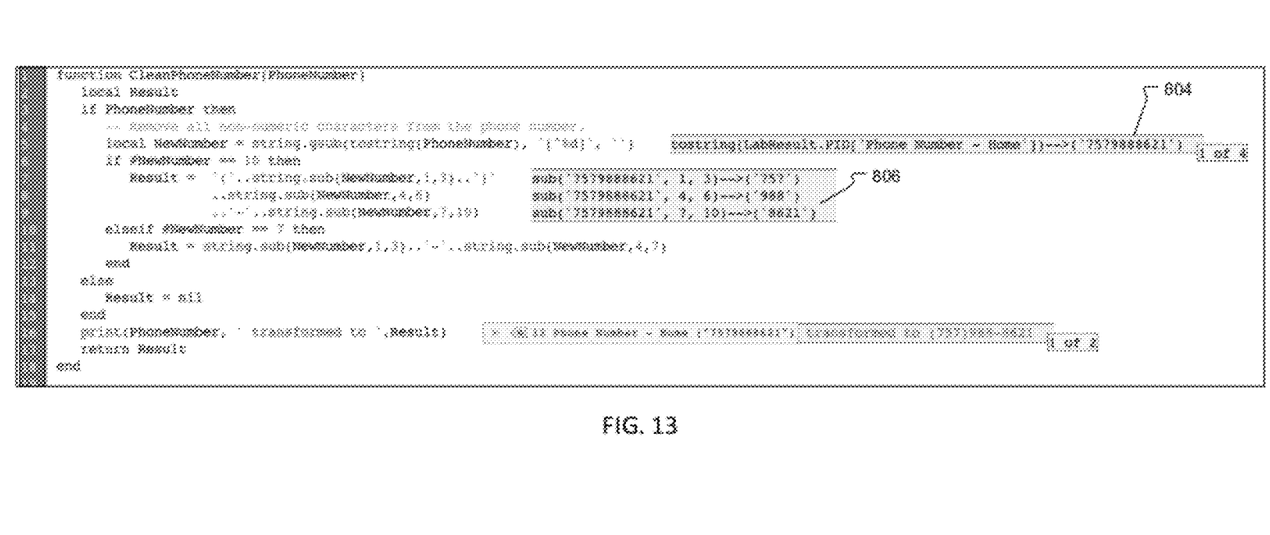
FIG. 13 illustrates an example of manipulating data with the code editor to transform the format of a telephone number.

FIG. 13 shows an example of manipulating data with the code editor to change the format of a telephone number.

Often data will need to be transformed from one format to another to be exchanged between computer systems. By way of an example, one computer system requires a phone number to be in the format of ten digits 804. And another system requires the phone number to be separated into the area code, prefix, and line number 806.

Figure 14:
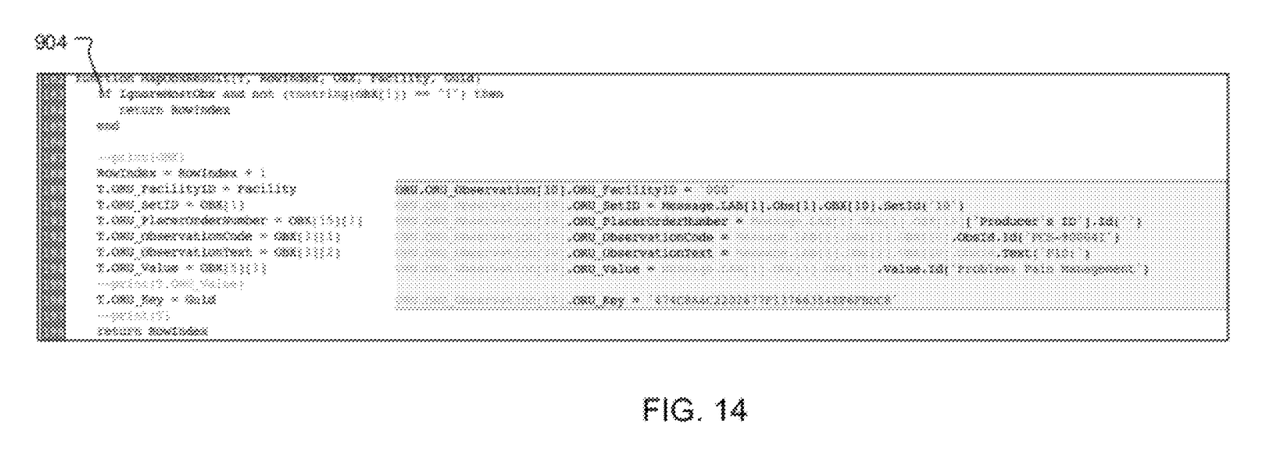
FIG. 14 illustrates an example of how to handle the sections of program code that have looping functions.

FIG. 14 shows an example of how to handle sections of program code that have a looping function 904. A looping function is a section of code that repeatedly performs the same section of code until a condition is met. Because the looping function performs the same section of code many times, the values of target variables will often changes with the iterations of the loop. Thus, it is necessary for the annotation GUI to organize and control the looping function to be able to select individual iterations to display in the code editor 104.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-implemented method for displaying source code annotations, the method comprising:
    receiving input at a code editor executing at the computer, the code editor operable in an edit mode to allow text editing of the input, the input comprising source code, the source code comprising instructions for mapping of values from one or more fields of a data source to one or more fields of a data destination;
    displaying the source code as received and edited in the code editor;
    automatically executing the source code by:
        compiling the source code into object code;
        sending the object code to an interface engine for execution thereby causing the interface engine to receive one or more structured messages from the data source containing values for performing the mapping, and to extract and collect from the structured messages, for each instruction of the source code from which the object code was derived, values of the one or more fields of the data source referenced by that instruction;
    receiving the collected field values from the interface engine; and
    for each displayed instruction of the source code, displaying an annotation comprising the value of any field referenced by that instruction as collected for that instruction, without exiting the edit mode.

2. The method of claim 1, wherein the automatically executing comprises executing the source code in response to a user moving a cursor to a different line.

3. The method of claim 1, wherein the displaying an annotation comprises displaying the annotation beside the corresponding instruction in the code editor.

4. The method of claim 1, wherein the input further comprises a search phrase, and wherein the method further comprises:
    triggering an autocompletion event for the search phrase;
    generating a list of autocompletion suggestions for the search phrase, the list comprising variable identifiers that contain the search phrase and collected values of corresponding fields;
    presenting the list of autocompletion suggestions to a user in the code editor and enabling user selection of an autocompletion suggestion; and
    replacing the search phrase in the source code with a selected one of the autocompletion suggestions.

5. The method of claim 4, wherein the list of autocompletion suggestions for the search phrase further comprises collected values of fields that contain the search phrase and identifiers of corresponding variables.

6. The method of claim 1, wherein the data source comprises HL7 messages from different computer systems.

7. The method of claim 1, wherein the data source is accessed via a query to a database.

8. The method of claim 1, wherein the data source is comprises an XML document.

9. The method of claim 1, wherein the data source is comprises an electronic data interchange document, the electronic data interchange document being a DICOM header, an X12 document, an EDIFACT document, a JSON message, or a SWIFT transaction.

10. The method of claim 1, wherein the data source comprises hierarchically tree structured data.

11. A non-transitory computer readable storage medium having stored therein instructions executable by a computer to perform the method of claim 1.

12. A computer system, comprising a memory and at least one processor, the memory storing software executable by the at least one processor, the software comprising:
- a code editor component that receives input and is operable in an edit mode to allow text editing of the input, the input comprising source code, the source code comprising instructions for mapping of values from one or more fields of a data source to one or more fields of a data destination;
- a compiler component that automatically executes the source code by compiling the source code into object code and sending the object code to an interface engine, causing the interface engine to receive one or more structured messages from the data source containing values for the mapping, and to extract and collect from the structured messages, for each instruction of the source code from which the object code was derived, values of the one or more fields of the data source referenced by that instruction;
- a display component that receives the collected field values from the interface engine and during the text editing of the input, for each instruction in the source code, displays an annotation comprising the value of any fields referenced by that instruction as collected for that instruction.

13. The computer system of claim 12, wherein the compiler component automatically executes the source code in response to a user moving a cursor to a different line.

14. The computer system of claim 12, wherein the display component displays each annotation beside the corresponding instruction in the code editor.

15. The computer system of claim 12, wherein the input further comprises a search phrase, and wherein the software further comprises:
- an autocompletion suggestion generator component that generates a list of autocompletion suggestions for the search phrase, the list comprising variable identifiers and corresponding collected values of fields whose identifiers contain the search phrase; and
- an autocompletion tool component that presents the list of autocompletion suggestions to a user and enables selection of an autocompletion suggestion.

16. The computer system of claim 12, wherein the input further comprises a search phrase, and wherein the software further comprises:
- an autocompletion suggestion generator component that generates a list of autocompletion suggestions for the search phrase, the list comprising variable identifiers and corresponding collected values of fields whose identifiers or collected field values contain the search phrase; and
- an autocompletion tool component that presents the list of autocompletion suggestions to a user and enables selection of an autocompletion suggestion.

17. A computer-implemented method for autocompletion of variable references in source code, the method comprising:
- receiving input at a code editor executing at the computer, the input comprising source code and a search phrase, the source code comprising instructions for mapping of values from one or more fields of a data source to one or more fields of a data destination;
- triggering an autocompletion event for the search phrase;
- upon triggering the autocompletion event, executing the source code by compiling the source code into object code and sending the object code to an interface engine, to execute the object code at least until a breakpoint is reached causing the interface engine to receive one or more structured messages from the data source containing values for the mapping and to extract and collect, from the structured messages, values of each of the one or more fields of the data source;
- receiving the collected field values from the interface engine;
- generating a list of autocompletion suggestions for the search phrase, the list comprising variable identifiers whose corresponding collected field value contains the search phrase;
- presenting the list of autocompletion suggestions to a user in the code editor and enabling user selection of an autocompletion suggestion; and
- replacing the search phrase in the source code with a selected one of the autocompletion suggestions.

18. The method of claim 17, wherein presenting the list of autocompletion suggestions to the user in the code editor comprises displaying the list of autocompletion suggestions beside the cursor in the code editor.

19. The method of claim 17, wherein the data source comprises HL7 messages from different computer systems.

20. The method of claim 17, wherein the data source is accessed via a query to a database.

21. The method of claim 17, wherein the data source is comprises an XML document.

22. The method of claim 17, wherein the data source is comprises an electronic data interchange document, the electronic data interface document being a DICOM header, an X12 document, an EDIFACT document, a JSON message, or a SWIFT transaction.

23. The method of claim 17, wherein the data source comprises hierarchically tree structured data.

24. A non-transitory computer readable storage medium having stored therein instructions executable by a computer to perform the method of claim 17.

25. A computer system, comprising a memory and at least one processor, the memory storing software executable by the at least one processor, the software comprising:
- a code editor component that receives input comprising source code and a search phrase, the source code comprising instructions for mapping of values from one or more fields of a data source to one or more fields of a data destination;
- a compiler component that upon the triggering of an autocompletion event for the search phrase executes the source code by compiling the source code into object code and sending the object code to an interface engine, to execute the object code at least until a breakpoint is reached thereby causing the interface engine to receive one or more structured messages from the data source containing values for the mapping and to extract and collect, from the structured messages, values of each of the one or more fields of the data source;
- an autocompletion suggestion generator component that receives the collected field values from the interface engine and generates a list of autocompletion suggestions for the search phrase, the list comprising variable identifiers whose corresponding collected field value contains the search phrase; and
- an autocompletion tool component that presents the list of autocompletion suggestions to a user and enables selection of an autocompletion suggestion.

26. The computer system of claim 25, wherein the autocompletion tool component presents the list of autocompletion suggestions beside the cursor in the code editor.

* * * * *